April 14, 1959   C. J. CARDONA   2,881,624
VARIABLE DRIVE
Filed Sept. 13, 1955
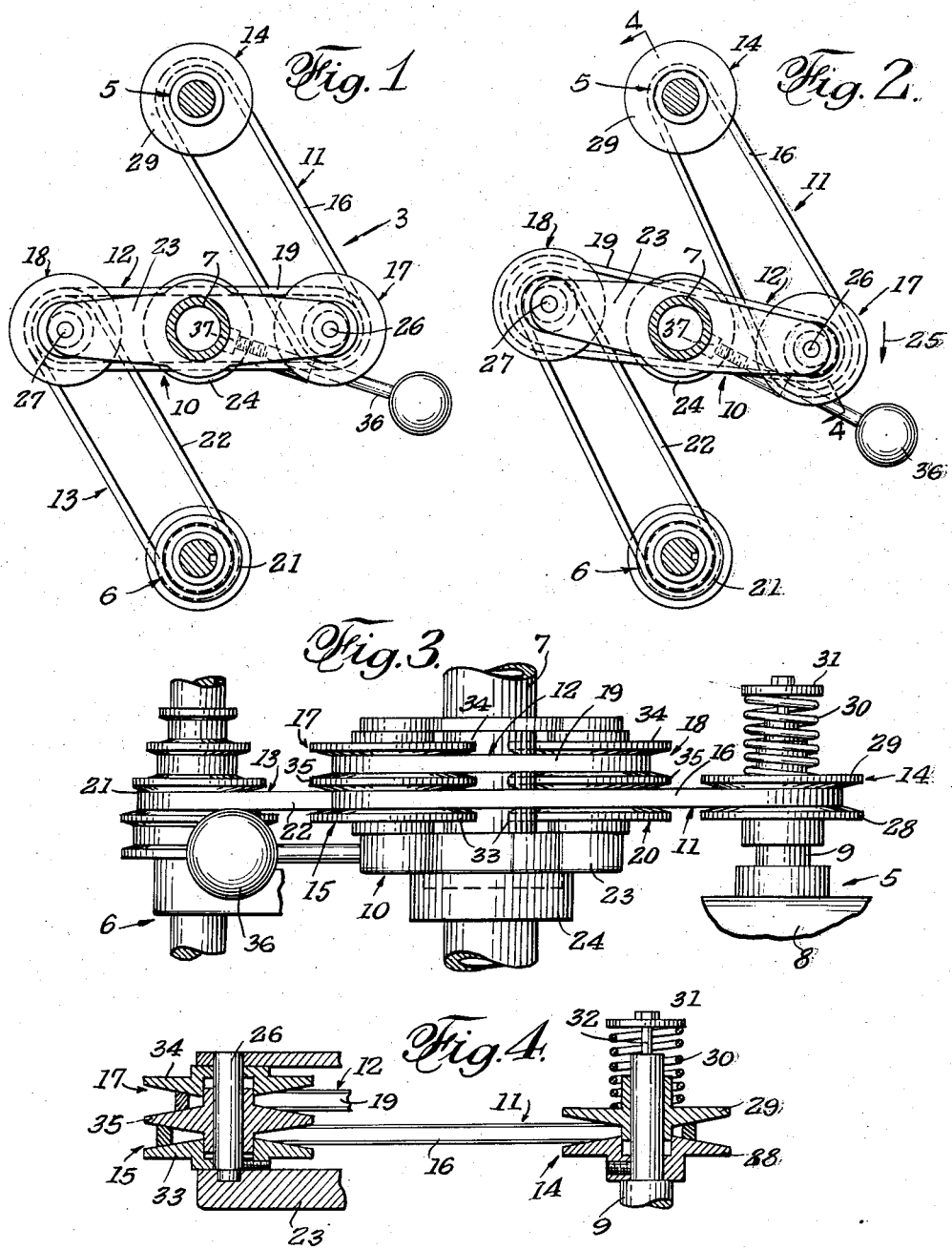
INVENTOR.
CARLOS J. CARDONA
BY C. G. Stratton
ATTORNEY

United States Patent Office 2,881,624
Patented Apr. 14, 1959

2,881,624

VARIABLE DRIVE

Carlos J. Cardona, North Hollywood, Calif.

Application September 13, 1955, Serial No. 533,938

4 Claims. (Cl. 74—230.17)

This invention relates to a variable speed drive and has for an object to provide a simple, novel and improved mechanism for obtaining increased or decreased speeds of a shaft or spindle with respect to a prime mover.

Another object of the invention is to provide a variable drive mechanism that is readily adapted to be embodied in existing machines, such as drill presses, lathes, etc.

A further object of the invention is to provide a variable speed drive mechanism that may be adjusted through a wide range to selectively increase or decrease the speed of a driven shaft relative to the speed of a driver.

The invention has also for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a plan sectional view showing a preferred form of variable drive according to the present invention.

Fig. 2 is a similar view showing the drive in another position.

Fig. 3 is a side elevational view thereof, the same being taken in the direction of arrow 3 of Fig. 1.

Fig. 4 is a cross-sectional view as taken on line 4—4 of Fig. 2.

As shown in the drawing, the present drive mechanism interconnects a prime mover or driver 5 and a driven member such as a shaft or spindle 6 to variably drive the latter at an increased or reduced speed, as desired. A member 7 carries the mechanism and may be interposed between said driver and driven member. As an example, the driver may comprise an electric motor 8 that has an operating shaft 9; the driven member 6 may be a toolholding element disposed in parallelism to motor shaft 9; and member 7 may comprise a fixed support such as the column of a drill press. Accordingly, the members 5, 6 and 7 comprise components of a drill press and the present drive mechanism 9 is provided to operatively connect the same.

The mechanism 9 is shown as comprising an adjustable means 10 carried by the member 7, a drive 11 connecting driver 5 and said means 10, a drive 12 between the opposite ends of means 10, and a drive 13 between said means 10 and driven member 6.

Drive 11 comprises an expandable pulley 14 on driver shaft 9, an expandable pulley 15 carried by one end of means 10, and an endless belt 16 trained over said pulleys. Drive 12 comprises an expandable pulley 17 axially aligned with pulley 15, an expandable pulley 18 carried by the opposite end of means 10, and an endless belt 19 trained over said latter pulleys. Drive 13 comprises an expandable pulley 20 axially aligned with pulley 18, a pulley 21 on the shaft or spindle 6, and an endless belt 22 trained over said latter pulleys. Thus, pulley 14 is a single pulley and pulleys 15 and 17, and 18 and 20, respectively, are double pulleys. Pulley 21, usually, is part of a stepped pulley, as shown in Fig. 3, the same being of fixed diametral size.

The means 10 is shown as a two-armed bracket 23 that is mounted for adjustable rotation around the axial center of member 7. In this case the bracket is supported by a ring 24 affixed to member 7 and may be swung thereon, as indicated by the arrow 25. The end of one arm of bracket 23 carries an axle or shaft 26 for pulleys 15 and 17. Similarly, the other arm carries a shaft 27 for pulleys 18 and 20.

The pulley 14 comprises a flange 28 that is affixed to shaft 9 and a flange 29 that is pressed toward flange 28 by a spring 30. Said spring has a washer 31 for an abutment, the same being carried by an extension 32 of shaft 9 and on which flange 29 is slidable. The adjacent faces of flanges 28 and 29 are conically tapered in the manner of grooved pulleys for wedge- or taper-sectioned belts.

The double pulleys are similar to each other. Each said pulley comprises spaced fixed flanges 33 and 34 affixed to shaft 26 which is rotatable in bracket 23; and a shiftable flange 35 on said shaft between flanges 33 and 34. See Fig. 4. The latter flanges are similar to flange 28 and are arranged with the conical faces in opposition. The flange 35 is formed with a double conical taper, each of which is paired with the respective flanges 33 and 34 to form a double expansion pulley in which one pulley expands as the other contracts according to the position of flange 35 between flanges 33 and 34.

In the position of Fig. 1, in which the axes of shafts 5 and 6 are the same distance from the axes of the respective shafts 26 and 27, the drive is one-to-one between the driver and the driven shaft. When the bracket 23 is shifted clockwise around the axis of column or member 7, as in Fig. 2, the distance between shafts 6 and 27 is increased. Since pulley 21 is of fixed size, the endless belt 22 will cause flange 35 of the double pulley 18, 20 to shift away from flange 33 of pulley 20 and toward flange 34 of pulley 18. Consequently, the effective size of pulley 20 will become smaller and the effective size of pulley 18 commensurately larger.

Since belt 19 is of fixed endless size, the increased size of pulley 18 will result in a decrease in effective size of pulley 17 (Fig. 4), because of the shift of flange 35 of the latter pulley away from flange 34 thereof. Hence, pulley 15 will increase in effective size, due to the shift of flange 35 thereof toward flange 33.

Now, therefore, the effective size of the driver pulley 14 will be decreased, as shown in Fig. 4, the movable flange 29 thereof shifting away from fixed flange 28 against the biasing force of spring 30.

Since, in each instance, a smaller pulley drives a larger pulley in the drive above achieved, the speed of the driven shaft 6 is less than that of the driver-shaft 9.

It will be clear, from the above, that pulley 17 will decrease in effective size because of the resultant shift of flange 35 thereof away from flange 34 (Fig. 4), because belt 19 is of fixed endless size.

Adjustment of bracket 23 counter-clockwise will cause an increase of the rotational speed of shaft 6 since increase of the effective size of pulleys 20 and 17 will cause decrease in the size of pulleys 18 and 15 and commensurate increase in the size of pulley 14. Since, in each instance in this arrangement, a larger pulley drives a smaller pulley, the speed of the driven shaft 6 is greater than that of driver shaft 9.

In the first instance, the tension on the belts causes spring 30 to contract and allow separation of the flanges 28, 29 of the pulley 14, while in the second instance, the slack in the belt enables the bias of said springs to bring said pulley flanges together.

By providing the bracket 23 with a handle 36 which also serves as means to apply pressure on shoe 37, said shoe may frictionally lock against member 7 to hold the bracket in rotationally adjusted position. If desired, the adjustment may be guided by suitable graduations marked on the peripheral faces of bracket 23 and fixed ring member 24.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. A variable drive comprising a rotationally adjustable bracket having first and second arms, first and second double pulleys carried in the ends of the first and second arms, respectively, each comprising first and second pulleys, one pulley of each double pulley being expandible in effective size while the other is contractible, a drive member provided with a size adjustable pulley having means resiliently urging it to greater size adjustment, an endless drive belt trained over and connecting the drive-member pulley and the first pulley of the first double pulley, an endless drive belt trained over and connecting the second pulley of the first double pulley, and the first pulley of the second double pulley, a driven member provided with a pulley of fixed size, and an endless belt trained over and connecting the driven member pulley and the second pulley of the second double pulley, the driven member and the drive member pulley being located on opposite sides of the rotationally adjustable bracket whereby rotational adjustment of the bracket increases the spacing of both the driven member pulley and the drive member pulley from the corresponding pulley of the rotationally adjustable bracket.

2. A variable drive comprising a bracket having first and second arms, first and second double pulleys carried on the ends of the first and second arms, respectively, each double pulley comprising first and second pulleys, one pulley of each double pulley being expandable in effective size while the other is contractable, a drive member provided with a size-adjustable pulley having means biasing the same to greater size adjustment, an endless belt trained over and connecting the drive-member pulley and the first pulley of the first double pulley, an endless belt trained over and connecting the second pulley of the first double pulley and the first pulley of the second double pulley, a driven member provided with a pulley of fixed size, an endless belt trained over and connecting the driven-member pulley and the second pulley of the second double pulley, means mounting said bracket and the arms thereof for movement relative to the drive and driven members, the drive-member and driven-member pulleys being located on opposite sides of the bracket-mounting means, and the arms of the bracket extending along a line crossing a line extending through said bracket-mounting means and the centers of the pulleys of the drive and driven member, and means to adjust the position of the bracket on said mounting means to change the spacing between the drive-member pulley and the double pulley connected therewith and the spacing between the driven-member pulley and the other double pulley.

3. A variable drive according to claim 1 in which a handle is provided on said bracket for effecting rotational adjustment thereof, and means is provided to lock the bracket in adjusted position by manipulation of the handle.

4. A variable drive according to claim 2 in which the bracket-adjusting means comprises a handle rotationally carried by the bracket, and means interposed between the handle and the bracket-mounting means to lock the adjusted position of the bracket by rotation of the handle.

References Cited in the file of this patent

UNITED STATES PATENTS

| | | |
|---|---|---|
| 2,151,189 | Coddington | Mar. 21, 1939 |
| 2,255,567 | McElroy | Sept. 9, 1941 |
| 2,689,484 | Phares | Sept. 21, 1954 |